US012558759B2

(12) United States Patent

Manjalivalapil et al.

(10) Patent No.: US 12,558,759 B2

(45) Date of Patent: Feb. 24, 2026

(54) USAGE OF FERROCHROME SLAG WITH OPTIMIZED PARTICLE SIZE AS A BLASTING ABRASIVE

(71) Applicant: SAUDI ARABIAN OIL COMPANY, Dhahran (SA)

(72) Inventors: Shaj K. Manjalivalapil, Abqaiq (SA); Sangki Chi, Dhahran (SA); Abbas Y. Al-Hulaimy, Al-Mubarraz (SA); Ebad Ul Haque, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1079 days.

(21) Appl. No.: 17/648,056

(22) Filed: Jan. 14, 2022

(65) Prior Publication Data

US 2023/0256566 A1 Aug. 17, 2023

(51) Int. Cl.
B24C 11/00 (2006.01)
C04B 33/138 (2006.01)

(52) U.S. Cl.
CPC ............ B24C 11/00 (2013.01); C04B 33/138 (2013.01)

(58) Field of Classification Search
CPC ....... B24C 11/00; B24C 9/006; C04B 33/138; C04B 2235/3206; C04B 2235/3241; C04B 2235/3272; C04B 2235/5427; C04B 2235/5463; C04B 35/14; C04B 35/16; C04B 35/62204
See application file for complete search history.

(56) References Cited

U.S. PATENT DOCUMENTS

| | | | |
|---|---|---|---|
| 4,222,786 | A | 9/1980 | Tuovinen et al. |
| 7,303,600 | B2 | 12/2007 | Roulston et al. |
| 2003/0136224 | A1 | 7/2003 | Sanger et al. |
| 2008/0021133 | A1 | 1/2008 | Furusawa et al. |
| 2010/0126389 | A1 | 5/2010 | Otsuka et al. |

FOREIGN PATENT DOCUMENTS

| | | | | |
|---|---|---|---|---|
| CN | 105907215 | A | 8/2016 | |
| CN | 109438767 | A * | 3/2019 | ............... C08K 3/36 |
| CN | 111763088 | A | 10/2020 | |
| EP | 0894571 | A1 | 2/1999 | |
| FR | 1348586 | A | 4/1964 | |

(Continued)

OTHER PUBLICATIONS

CN109438767A machine translation (Year: 2019).*
First Examination Report issued in Saudi Arabia Application No. 123441046, dated Mar. 14, 2024 (8 pages).

*Primary Examiner* — Cameron K Miller

(74) *Attorney, Agent, or Firm* — Osha Bergman Watanabe & Burton LLP

(57) ABSTRACT

A blasting abrasive and a method of use are provided. The blasting abrasive includes a ferrochrome slag having a composition of $SiO_2$ in a range of from about 30 to 40 wt % (weight percent); $Al_2O_3$ in a range of from about 25 to 35 wt %; of $Fe_2O_3$, $Cr_2O_3$, or a combination thereof in a range of from about 10-20 wt %; MgO in a range of from about 15 to 25 wt %, by weight of the ferrochrome slag. The ferrochrome slag has a particle size in a range of from about 100 to 850 μm (micrometers) with a particular size distribution.

11 Claims, 1 Drawing Sheet

(56)          References Cited

FOREIGN PATENT DOCUMENTS

| | | | |
|---|---|---|---|
| JP | S569168 | A | 1/1981 |
| JP | S6239179 | A | 2/1987 |
| JP | 2642046 | B2 | 8/1997 |
| JP | H1158243 | A | 3/1999 |
| JP | 2011083869 | A | 4/2011 |
| RU | 2398955 | C1 | 9/2010 |
| SU | 1528765 | A1 | 12/1989 |
| WO | 1999051399 | A1 | 10/1999 |

* cited by examiner

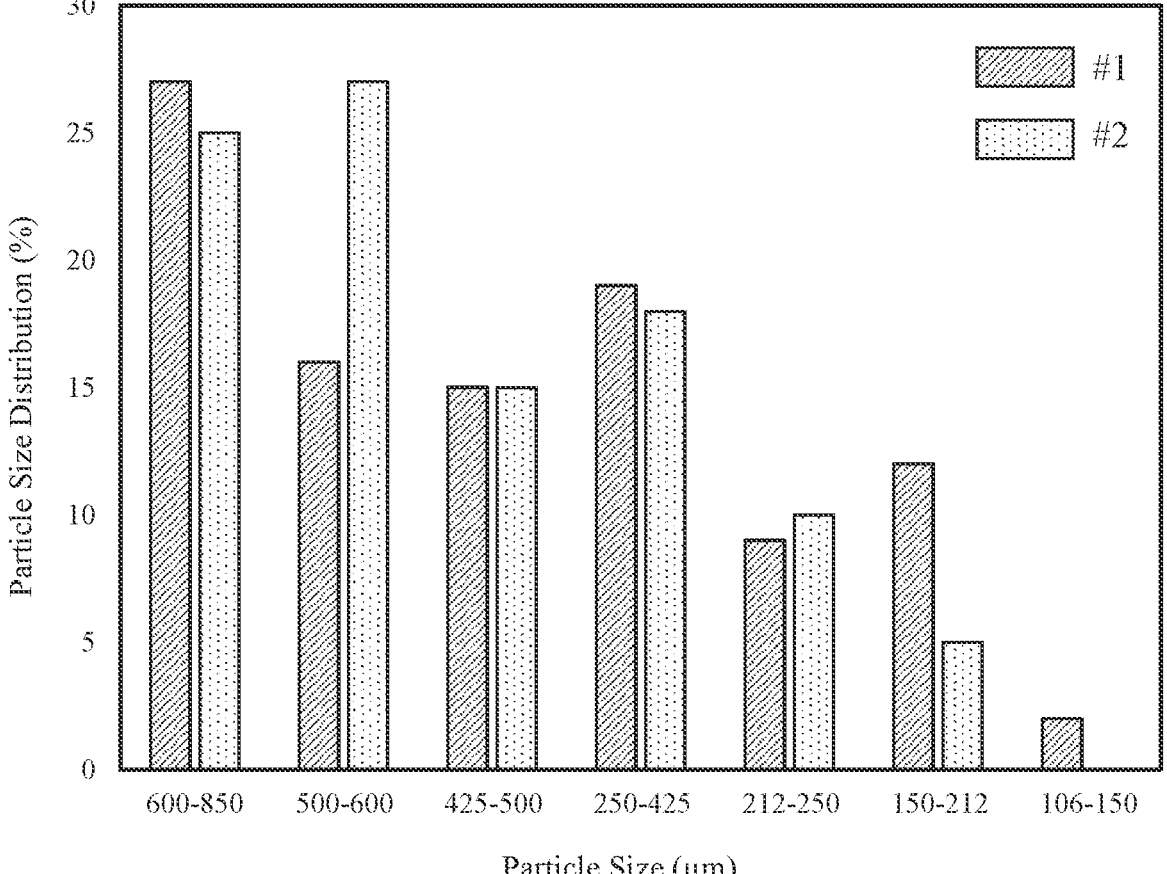

USAGE OF FERROCHROME SLAG WITH OPTIMIZED PARTICLE SIZE AS A BLASTING ABRASIVE

BACKGROUND

Surface preparation, including blasting treatment, is an essential process for coating applications. Blasting removes oxidized layers, old coatings, surface contaminants and rust. These are the major factors that contribute to coating failure. Further, surface preparation may generate an anchor profile with a predetermined roughness that enhances adhesive strength of the coating.

Abrasive blasting is the operation of forcibly propelling a stream of abrasive material against a surface under elevated pressure to smooth a rough surface, roughen a smooth surface, shape a surface, or remove surface contaminants. Commonly used blasting abrasives may include steel abrasives, garnet, coal slag, and ferrochrome slag. A naturally occurring resource, garnet, has availability issues due to mining and environmental concerns as well as export restrictions. The availability of coal slag is also limited and restricted due to greenhouse gas emissions.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect, embodiments disclosed relate to a blasting abrasive. The blasting abrasive may comprise a ferrochrome slag having a composition of $SiO_2$ in a range of from about 30 to 40 wt % (weight percent); $Al_2O_3$ in a range of from about 25 to 35 wt %; of $Fe_2O_3$, $Cr_2O_3$, or a combination thereof in a range of from about 10-20 wt %; MgO in a range of from about 15 to 25 wt %, by weight of the ferrochrome slag. The ferrochrome slag may have a particle size in a range of from about 100 to 850 μm (micrometers).

In one or more embodiments, the ferrochrome slag composition may further comprise CaO in a range of greater than 0 to about 5 wt %, by weight of the ferrochrome slag.

In one or more embodiments, the ferrochrome slag may have a particle size distribution in a range of from about 25 to 30% of particles sized in a range of from 600 to 850 μm, in a range of from about 10 to 20% of particles sized in a range of from 500 to 600 μm, in a range of from about 10 to 20% of particles sized in a range of from 425 to 500 μm, in a range of from about 15 to 25% of particles sized in a range of from 250 to 425 μm, in a range of from about 5 to 10% of particles sized in a range of from 212 to 250 μm, in a range of from about 10 to 15% of particles sized in a range of from 150 to 212 μm, in a range of from about 0.1 to 5% of particles sized in a range of from 106 to 150 μm, based on number of particles. No particles have a particle size less than 106 μm.

In one or more embodiments, the ferrochrome slag may have a particle size distribution in a range of from about 20 to 30% of particles sized in a range of from 600 to 850 μm, in a range of from about 20 to 30% at 500 to 600 μm, in a range of from about 10 to 20% of particles sized in a range of from 425 to 500 μm, in a range of from about 15 to 20% of particles sized in a range of from 250 to 425 μm, in a range of from about 8 to 13% of particles sized in a range of from 212 to 250 μm, and in a range of from about 2 to 10% of particles sized in a range of from 150 to 212 μm, based on number of particles. No particles have a particle size less than 150 μm.

In one aspect, embodiments disclosed relate to a method of surface preparation. The method may include introducing a blasting abrasive suspension onto a surface such that a contaminant is removed from the surface such that a treated surface forms. The blasting abrasive suspension is comprised of a ferrochrome slag as previously described that is suspended in a carrier gas.

Other aspects and advantages of the claimed subject matter will be apparent from the following description and the appended Claims.

BRIEF DESCRIPTION OF DRAWINGS

FIG. 1 shows particle size distribution of ferrochrome slag blasting abrasives according to one or more embodiments.

DETAILED DESCRIPTION

In the following, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

A "blasting abrasive" is a material used to shape or finish a surface of a workpiece through grinding or rubbing, which leads to part of the workpiece being worn away by friction. One skilled in the art would appreciate that abrasive may also be referred to as abrasive, or blasting material, or blasting media, or media. A pressurized fluid or carrier gas, typically a compressed air, or a centrifugal wheel may be used to propel the blasting abrasive. Most commonly used blasting abrasives may include, but are not limited to, aluminum oxide, cast iron, steel grit or shot, silica sand, metal slag, garnet, and coal slag. Steel abrasives are mostly used for shop application in production line and non-metallic abrasives (for example, garnet or coal slag) may be used for shop and field applications. However, non-metallic abrasives may have availability issues due to their scarcity in the market because non-metallic abrasives normally originate from natural resources. On the other hand, ferrochrome slag, a waste material from stainless steel manufacturing process, could be recycled without depleting the natural resources.

There exists a need for blasting abrasives with excellent blast-cleaning efficiency (or workability), improved adhesive strength between the coating and the surface, less consumption rate, and a lowered blast-cleaning cost by making the recycling of the blasting abrasive practicable.

Ferrochrome slag is a by-product of stainless steel production, more specifically, from the quenched and solidified slag of high-carbon ferrochromium. Ferrochrome slag is usually refined and formed as a liquid at 1700° C. Ferrochromium slag comprises mainly silica ($SiO_2$), aluminum oxide ($Al_2O_3$), and magnesium oxide (MgO), with certain amount of chrome oxide ($Cr_2O_3$), ferrous oxide (FeO), ferric oxide ($Fe_2O_3$), and calcium oxide (CaO). The cubic or angular shape of the ferrochrome slag has with multiple cutting edges. Such cutting edges are advantageous in blasting treatment providing high blast-cleaning efficiency. Further, the ferrochrome slag has a high resistance to shattering on impact which results in low dust operations.

The blasting abrasive according to one or more embodiments may be obtained by crushing or grinding a metal refining slag after spraying or granulation, or by crushing or grinding a molten slag after spraying or granulation. In one or more embodiments, the blasting abrasive may be obtained by crushing or grinding a refining slag of high-carbon ferrochromium after spraying or granulation, by crushing and pelletizing the refining slag of high-carbon ferrochromium after granulation, or by pelletizing a refining slag of high-carbon ferrochromium after being used for blasting treatment. In one or more embodiments, the blasting abrasive is collected from a furnace, washed, and dried to remove contaminants prior to crushing or grinding. The blasting abrasives have a particle shape with cutting edges and fractured surfaces. According to one or more embodiments, the blasting abrasive may have a range of particle size and a particular size distribution obtained through sifting, such as through mesh screens or by blending several different ranges of sizes.

The blasting abrasive according to one or more embodiments may include ferrochrome slag having oxides of Mg, Al, Si and Cr, and phases of glass, spinel ($Al_2O_3$—MgO), and forsterite (MgO—$SiO_2$). As such, the blasting abrasive may be refined and hard, and unlikely to be fractured. Even when the blasting abrasive is fractured due to the collision impact at a treated surface, such a refined slag would produce relatively large particles and no dust because it is fractured intercrystallinely.

The blasting abrasive according to one or more embodiments may have a particle shape with cutting edges and fractured surfaces, for example, cubic or angular. The blasting abrasive may have a hardness of 7-8 Mohs, forming a suitable anchor profile upon impact with the surface of the treated material.

In one or more embodiments, the blasting abrasive may comprise a ferrochrome slag having a composition in a range of from about 30 wt % (weight percent) to 40 wt % of $SiO_2$; from about 25 wt % to 35 wt % of $Al_2O_3$; from about 10 wt % to 20 wt % of $Fe_2O_3$, $Cr_2O_3$, or a combination of both; from about 15 wt % to 25 wt % of MgO; and from about 0 wt % to 5 wt % of CaO by weight of the ferrochrome slag. In one or more embodiments, the blasting abrasive may also include one or more of Fe, Cr, and $TiO_2$.

The particle size and the particle size distribution of the ferrochrome slag are factors affecting the rate and efficiency of the blasting treatment. The choice of particle size as well as particle size distribution may be selected based on specific requirements of the blasting treatment. Fine grade abrasives may be efficient in cleaning relatively new steel or bare steel surfaces, whereas coarse grades may be required for coated or heavily corroded surfaces.

The ferrochrome slag of one or more embodiments may have a particle size in a range of from about 100 to 2000 μm (micrometers), or from about 100 to 1000 μm, or from about 100 to 850 μm. The particle size may be obtained through sifting, such as through mesh screens. In one or more embodiments, the ferrochrome slag may have a particle size distribution in a range of from about 20% to 30% of the particles being within the 500 to 600 μm range, in a range of from about 15% to 30% of the particles being within the 425 to 500 μm range, in a range of from about 10% to about 20% of the particles being within the 250 to 425 μm range, in a range of from about 15% to 25% of the particles being within the 212 to 250 μm range, in a range of from about 5% to 15% of the particles being within the 150 to 212 μm range, in a range of from about 2% to about 15% of the particles being within the 106 to 150 μm range, and in a range of from 0% to 5% of the particles being less than 106 μm, based on the number of particles.

In one or more embodiments, the ferrochrome slag may have the same particle size as previously described but have a particle size distribution in a range of from about 25 to 30% of particles sized in a range of from 600 to 850 μm, in a range of from about 10 to 20% of particles sized in a range of from 500 to 600 μm, in a range of from about 10 to 20% of particles sized in a range of from 425 to 500 μm, in a range of from about 15 to 25% of particles sized in a range of from 250 to 425 μm, in a range of from about 5 to 10% of particles sized in a range of from 212 to 250 μm, in a range of from about 10 to 15% of particles sized in a range of from 150 to 212 μm, in a range of from about 0.1 to 5% of particles sized in a range of from 106 to 150 μm, based on number of particles. No particles have a particle size less than 106 μm.

In one or more embodiments, the ferrochrome slag may have the same particle size as previously described but have a particle size distribution in a range of from about 20 to 30% of particles sized in a range of from 600 to 850 μm, in a range of from about 20 to 30% at 500 to 600 μm, in a range of from about 10 to 20% of particles sized in a range of from 425 to 500 μm, in a range of from about 15 to 20% of particles sized in a range of from 250 to 425 μm, in a range of from about 8 to 13% of particles sized in a range of from 212 to 250 μm, and in a range of from about 2 to 10% of particles sized in a range of from 150 to 212 μm, based on number of particles. No particles have a particle size less than 150 μm.

The blasting abrasive according to one or more embodiments may be used in a variety of applications on surfaces, including glass, stone, metal, wood, plastics, steel (for example, carbon steel, galvanized steel, stainless steel), alloy, brass, aluminum, and silver. The blasting abrasive may be used in shop and field applications, on various coated, corrosive, or bare surfaces. The characterization of the blasting abrasive may be performed through a series of shop or field tests. The characterization of the blasting abrasive may be performed through standard procedures known to one skilled in the art, including but not limited to *"Preparation of steel substrates before application of paints and related products—Visual assessment of surface cleanliness—Part 1: Rust grades and preparation grades of uncoated steel substrates and of steel substrates after overall removal of previous coatings"* ISO 8501-1: 2007; *"Preparation of steel substrates before application of paints and related products—Tests for the assessment of surface cleanliness—Part 3: Assessment of dust on steel surfaces prepared for painting (pressure-sensitive tape method)"* ISO 8502—3: 2017; *"Preparation of steel substrates before application of paints and related products—Tests for the assessment of surface cleanliness—Part 6: Extraction of water soluble contaminants for analysis (Bresle method)"* ISO 8502-6: 2020; *"Preparation of steel substrates before application of paints and related products—Surface roughness characteristics of blast-cleaned steel substrates—Part 5: Replica tape method for the determination of the surface profile"* ISO 8503-5: 2017; *"Preparation of steel substrates before application of paints and related products—Specifications for non-metallic blast—cleaning abrasives—Part 10: Almandite garnet"* ISO 11126-10: 2017; *"Paints and varnishes—Corrosion protection of steel structures by protective paint systems—Part 9: Protective paint systems and laboratory performance test methods for offshore and related structures"* ISO 12944-9: 2018; *"Paints and var-*

*nishes—Performance requirements for protective paint systems for offshore and related structures"* ISO 20340: 2009; *"Paints and varnishes—Methods of exposure to laboratory light sources—Part* 3: *Fluorescent UV lamps"* ISO 16474-3: 2021; *"Paints and varnishes—Corrosion protection of steel structures by protective paint systems—Measurement of, and acceptance criteria for, the thickness of dry films on rough surfaces"* ISO 19840: 2012; *"Paints and varnishes—Evaluation of degradation of coatings—Designation of quantity and size of defects, and of intensity of uniform changes in appearance"* ISO 4628: 2011-2016; *"Paints and varnishes—Pull-off test for adhesion"* ISO 4624: 2016; *"Paints and varnishes—Cross-cut test"* ISO 2409: 2020; and *"Paints and varnishes—Determination of resistance to cathodic disbonding of coatings exposed to sea water"* ISO 15711: 2003. Characterization of the blasting abrasive may also be performed by other standardized procedures known to the skilled person in the art.

In one or more embodiments, the blasting abrasive may have a standard grade of cleanliness of Sa 2.5 or Sa 3, corresponding to thorough blast cleaning or blast cleaning to clean steel as determined by visual assessment. The surface cleanliness may be measured with procedures in accordance with ISO 8501-1 standard, which is known to one skilled in the art.

The blasting abrasive according to one or more embodiments, after a blasting treatment to a surface, may provide a surface profile (or anchor profile) in a range of from about 50 to 100 μm, such as from about 70 to 100 μm, or from about 70 to 80 μm for the treated surface. The surface profile may be measured through surface comparator, depth gauge, or replica tape providing information on profile height, peak density, or both. The surface profile of the treated surface may be measured with procedures in accordance with ISO standard 8503-5, which is known to the skilled person in the art. The surface profile of the blasting abrasive may be measured through a digital gauge, which uses a probe pressed onto the treated surface and measures the height from the peak to depth of the treated surface. The used of digital gauge may reduce risk of inspector error and can provide quick results. The measured surface profiled may be averaged over a plurality of measurements for accuracy.

Presence of non-visible contaminants, such as chlorides or other soluble salts, on an abrasive used for surface preparation may be a cause for concern. High levels of non-visible contaminants may affect the quality or duration of the adhesion of the coating. Such contaminants may originate from water containing chloride or sulfate salts, or condensation and moisture from atmosphere, or transferred through recycling of the abrasive. In one or more embodiments, the chloride content may be measured by a conductivity test, such as procedures in accordance with ISO standard 8502-6, also known as Bresle method. In one or more embodiments, the blasting abrasive may have a chloride content of no more than about 20 mg/m$^2$ (milligrams per meter squared), such as in a range of from about 15 to 20 mg/m$^2$, or no more than about 15 mg/m$^2$, such as in a range of from about 5 to 15 mg/m$^2$.

Dust remaining on the blast-cleaned surface may reduce the adhesive strength of the coating film or paint. It may also promote corrosion due to moisture and coating failure. The blasting abrasive of one or more embodiments may produce no dust or very little dust when applying. A surface dust test may be performed after air-blowing the blast-cleaned surface and may be performed based on the procedures in accordance with ISO standard 8502-3, which is known to a skilled person in the art, to ensure all dust and grit being removed from the surface. After completion of abrasive blasting, the surface may be subjected to an air blow at about 90 to 120 psi (pounds per square inch) by an air compressor. A clear adhesive (for example, pressure-sensitive) tape may be pulled from the blast-cleaned surface and adhered to a displaying board. The tape indicates a pattern of adhered dust and is compared with the pictorial figure with procedures in accordance with ISO standard 8502-3. The quantity of the dust is classified 1 through 5, where 1 is lowest and 5 is greatest amount of dust. Class 1 or 2 may be acceptable. Classes 3, 4, and 5 may be subjected to cleaning and re-test. Under the surface dust test, the blasting abrasive according to one or more embodiments may produce a quantity of dust of Class 2 or better.

The blasting abrasive according to one or more embodiments may have an abrasive consumption rate less than comparable abrasives (for example, garnet or coal slag). The abrasive consumption rate is evaluated by a quantity of abrasive needed in blasting treatment of a certain area of surface. In one or more embodiments, the abrasive consumption rate is evaluated by the quantity of abrasive needed to remove a coating film of certain area. The abrasive consumption rate for one or more embodiment blasting abrasives may be in a range of at least 10% less, or at least 20% less, or at least 25% less, or at least 30% less compared to a comparable abrasive, under same conditions of blasting. An example of a comparable abrasive may include garnet or coal slag, with a similar range of particle size.

The workability of a one or more embodiments blasting abrasive may be evaluated by the blasting time needed for blasting treatment of a surface of certain area. In one or more embodiments, the blasting time of abrasives in the present disclosure may be less than a blasting time of comparative abrasives. The comparative abrasives may be commonly used abrasives in the field, for example, garnet and coal slag. In one or more embodiments, the blasting time of abrasives may be almost the same with a blasting time of comparative abrasives.

The blasting abrasive according to one or more embodiments may be evaluated through coating performance tests, such as cyclic test and seawater immersion test, to ensure coating quality. The coating performance tests may be conducted according to various ISO standards that are known to a person skilled in the art, including cyclic test with procedures in accordance with ISO standard 12944-9 (formally ISO 20340) and sea water immersion test with procedures in accordance with ISO standard 2812-2. Prior to the coating performance tests, the blasting abrasive according to one or more embodiments and comparative abrasives are used in blasting treatments for surface preparation to a degree of surface cleanliness. A desired surface profile of the abrasive blasted surface may be in the range of from about 50 to 100 μm. All the blasting treatment and coating conditions are kept consistent for surfaces using different abrasives. A coating material (for example, a paint) may be used onto a treated surface for coating performance tests. The coating material is mixed, applied, and cured to achieve a dry coating film having a specified thickness in microns. In a cyclic test, the coated surface may be exposed to accelerated weather, salt spray, and low temperature, and show no sign of blistering, cracking, rusting, flaking, or corrosion creep. The characterization of the blasting abrasive according to one or more embodiments may be conducted through an adhesion test. After a surface is treated with the blasting abrasive and coated with a coating film the adhesion strength is measured by a pull-off test following procedures in accordance with ISO standard 4624. A coated surface using the blasting abrasive may have a higher adhesion strength comparing to surfaces treated by comparative abrasives.

The blasting abrasive according to one or more embodiments may be recycled. In one or more embodiments, the blasting abrasive may be recycled for at least once, or at least twice, or at least three times. In one or more embodiments, the blasting abrasive is washed and screened prior to recycling.

According to one or more embodiments, a method of surface preparation includes introducing a blasting abrasive suspension onto a surface such that a contaminant is removed from the surface such that a treated surface forms. The blasting abrasive suspension comprises a ferrochrome slag suspended in a carrier gas. In one or more embodiments, the carrier gas is air. The carrier gas may be pressurized to a pressure in a range of from 90 to 100 psi (pounds per square inch) before introduction to the surface. The ferrochrome slag comprise a ferrochrome slag composition previously described.

EXAMPLES

The following examples are merely illustrative and should not be interpreted as limiting the scope of the present disclosure.

Example 1: Chemical Composition and Physical Properties of Abrasives

The blasting abrasive used in one or more examples was a ferrochrome slag having a chemical composition and physical properties as listed in Table 1 (Example 1). The ferrochrome slag was a crushed gray, granular material, cubic or angular in shape with multiple cutting edges. Garnet and coal slag, each having chemical compositions and physical properties as listed in Table 1, were used as comparative abrasives. The garnet and coal slag comparative abrasives were used in all the examples of the present disclosure, unless stated otherwise. The garnet and the ferrochrome slag abrasives showed similar particle size ranges, chemical compositions and physical properties with the ferrochrome slag.

Garnet is a naturally-occurring silicate mineral. The harder species of garnet, such as almandine, may be used as blasting abrasives with a hardness range of 6.5 to 7.7 Mohs. Once extracted, it may be washed, processed, and screened to a necessary grade for use as blasting abrasive. Where conditions allow, garnet abrasives may be recycled and used as an economical alternative to aluminum oxide, cast iron, or steel grit. Garnet may be most commonly used as a high-performance blasting abrasive for the cleaning of aluminum and fiber glass structures. Because it is an inert, non-toxic, naturally-occurring mineral, garnet abrasive is also used on sites where water contamination is a concern, such as dry docks, bridges, and harbors. Garnet does not produce as much dust, therefore is suited for use in confined spaces such as tanks and containers.

Coal slag, or boiler slag, is a recycled by-product from coal combustion in power plants. When coal is fired at over 2500° C., it melts and produces a by-product as coal slag. When the coal slag is cooled through a vitrification process, it may crystallize and form angular granules in a variety of sizes. Screening processes may be performed to remove dust and unburnt coal, and to screen the remaining crystals into five different categories for different applications.

TABLE 1

| The chemical compositions and physical compositions of different blasting abrasives. | | | |
|---|---|---|---|
| | Ferrochrome Slag | Garnet | Coal Slag |
| $SiO_2$ | 33.5% | 35.4% | 42.0% |
| $Al_2O_3$ | 27.5% | 20.3% | 5.0% |
| $Fe_2O_3$ or $Cr_2O_3$ | 17.0% | 31.5% | 31.0% |
| MgO | 18.2% | 6.9% | 15.0% |
| CaO | 2.8% | 1.3% | 6.0% |
| Particle size | 100-850 μm | 250-595 μm | 200-1400 μm |
| Particle Shape | Cubic/Angular | Round/Sub angular | Angular |
| Hardness (Mohs) | 7-8 | 7-8 | 7 |
| Specific Gravity | 3.6 | 4.1 | 3.2 |

Two ferrochrome slag samples having different particle size distributions were provided. FIG. 1 shows the particle size distributions of ferrochrome slag #1 (Example 1) and ferrochrome slag #2 (Example 2). Ferrochrome slag samples #1 and #2 have the same composition and different size contributions.

TABLE 2

| methods and equipment used in shop and field tests, and the criteria of each characterization. | | | |
|---|---|---|---|
| Test Item | Method | Criteria | Equipment |
| Surface cleanliness | ISO 8501-1 | Sa 2.5 to Sa 3.0 | Visual assessment |
| Surface profile | ISO 8503-5 | 50-100 μm | Profile gauge |
| Chloride contents | ISO 8502-6 | ≤20 mg/m$^2$ | Bristle tester |
| Dust | ISO 8502-3 | Class 2 or less | Tape |
| Blasting time | — | — | Stopwatch |
| Consumption | — | — | Scale |

Different blasting abrasives were used for surface preparation on bare steel and coated panels. Characterization of the surface after treated with the blasting abrasives were conducted under procedures in accordance with ISO standards 8501-1, 8503-5, 8502-6, and 8502-3, which are known to the skilled person in the art. See Table 2 for more information for evaluation method, criteria, and equipment used.

Example 2 Shop Tests on Bare Steel

TABLE 3

| Characterization of bare steel panels after surface preparation using different blasting abrasives. | | | |
|---|---|---|---|
| Test Item | Ferrochrome Slag #1 | Garnet | Coal Slag |
| Surface cleanliness | Sa 2.5 | Sa 2.5 | Sa 2.5 |
| Surface profile | 74-80 μm | 70-72 μm | 98-104 μm |
| Chloride contents | 16 | 12 | 14 |
| Dust | Class 1 | Class 1 | Class 1 |
| Blasting time | 294 s | 282 s | 305 s |
| Consumption rate | 50 kg/m$^2$ | 65 kg/m$^2$ | 75 kg/m$^2$ |

A blasting machine with 200 liter blast pot capacity was used with a 1¼ inch (32 mm (millimeters)) blast hose having a length of 20 m (meters). An operating pressure was 90 psi. Under the same blasting conditions, the blasting abrasive including ferrochrome slag sample #1 showed 23% and 33% less consumption rate comparing to garnet and coal slag, respectively with similar workability evaluated by blasting time. Visual assessment of the three treated panels showed that the surface treated by ferrochrome slag sample #1 was most uniform in color.

Example 3 Shop Tests on Coated Panels Using Ferrochrome Slag #1

TABLE 4 characterization of coated panels after surface preparation using different blasting abrasives.

| Test Item | Ferrochrome Slag #1 | | Coal Slag | |
|---|---|---|---|---|
| Coating material | Epoxy 1 | Epoxy 2 | Epoxy 1 | Epoxy 2 |
| Surface cleanliness | Sa 2.5 | | Sa 2.5 | |
| Surface profile | 76-78 μm | | 84-90 μm | |
| Dust | Class 1 | | Class 1 | |
| Blasting time (s/0.81 m2) | 844 | 1296 | 650 | 818 |
| Consumption rate | 64.8 kg/m$^2$ | | 89.5 kg/m$^2$ | |

"kg/m$^2$" means kilograms per meter squared.

A blasting machine with 200 liter blast pot capacity was used with a 1¼ inch (32 mm) blast hose having a length of 20 m. An operating pressure was 94 psi. The coated panels were coated with two coating materials, namely epoxy 1 and epoxy 2. Under the same blasting conditions, the blasting abrasive including ferrochrome slag sample #1 showed 27% less consumption rate comparing to coal slag with a longer blasting time. Visual assessment of the three treated panels showed that the surface treated by ferrochrome slag sample #1 was more uniform in color. Black particles were observed on surfaces blasted by the coal slag.

Example 4 Shop Tests on Coated Panels Using Ferrochrome Slag #2

TABLE 5 characterization of coated panels after surface preparation using different blasting abrasives

| Test Item | Ferrochrome Slag #2 | | Garnet | |
|---|---|---|---|---|
| Coating material | Epoxy 1 | Epoxy 2 | Epoxy 1 | Epoxy 2 |
| Surface cleanliness | Sa 2.5 | | Sa 2.5 | |
| Surface profile | 70-74 μm | | 70-72 μm | |
| Dust | Less than Class 1 | | Less than Class 1 | |
| Blasting time (s/0.81 m$^2$) | 555 | 718 | 567 | 716 |
| Consumption rate | 60.5 kg/m$^2$ | | 89.0 kg/m$^2$ | |

A blasting machine with 200 liter blast pot capacity was used with a 1¼ inch (32 mm) blast hose having a length of 20 m. An operating pressure was 94 psi. The coated panels were coated with two coating materials, namely epoxy 1 and epoxy 2. Under the same blasting conditions with Example 3, the blasting abrasive including ferrochrome slag sample #2 showed 32% less consumption rate comparing to garnet with a similar blasting time. Visual assessment of the three treated panels showed that the surface treated by ferrochrome slag sample #2 was more uniform in color.

Ferrochrome slag sample #2 had a modified size distribution and showed improved blasting time of about 30% less comparing to ferrochrome slag sample #1. The consumption rate of ferrochrome slag sample #2 showed a significantly reduced amount compared to garnet.

Example 5 Field Tests

TABLE 6 characterization of the process vessel surface after treatment using ferrochrome slag #2.

| Test Item | Ferrochrome Slag #2 |
|---|---|
| Surface cleanliness | Sa 2.5 to Sa 3.0 |
| Surface profile | 76-102 μm |
| Dust | Class 1 to Class 2 |
| Chloride content | 7-13 mg/m$^2$ |
| Consumption rate | 64.3 kg/m$^2$ |

A field test was performed on an internal surface of an existing vessel. Under an operating pressure of 100 psi, the blasting abrasive containing ferrochrome slag #2 showed satisfied workability and similar consumption rate comparing to the shop tests.

Example 6 Coating Performance Tests

Coating performance tests were conducted to evaluate the stability of a coated surface after blasting treatments using different blasting abrasives. The coating performance tests included cyclic test under procedures in accordance with ISO 12944-9 (or ISO 20340) and seawater immersion test under procedures in accordance with ISO 2812-2. The coating performance tests were conducted under two systems: epoxy coating system for atmospheric service (epoxy coating) and epoxy coating for immersion service (phenolic epoxy coating).

Before coating application, three different abrasive materials were used for surface preparation. By visual assessment, the surface treated with coal slag was rougher than the surfaces treated with garnet and ferrochrome slag.

TABLE 7 characterization of surfaces treated with different blasting abrasives before coating application.

| Test Item | Ferrochrome Slag #1 | Garnet | Coal Slag |
|---|---|---|---|
| Surface cleanliness | Sa 2.5 | Sa 2.5 | Sa 2.5 |
| Surface profile | 65 μm | 56 μm | 79 μm |
| Chloride contents | 11 | 13 | 10 |
| Dust | Class 1 | Class 1 | Class 2 |

After surface preparation using different blasting abrasives, phenolic epoxy coatings were applied to the treated panels for coating performance tests. Seawater immersion tests were conducted using procedure disclosed in ISO 2812-2 with an artificial seawater. The artificial seawater had a composition of 23.0 g/L (grams per liter solute) sodium chloride, 9.8 g/L of magnesium chloride hexahydrate, 8.9 g/L of sodium sulphate decahydrate, and 1.2 g/L of calcium chloride. The artificial seawater was heated to 40° C. Coated panels, each having a horizontal cut scratch with 2 mm width and 50 mm length, were fully immersed into the heated artificial seawater, with a minimum of 50 mm water above the top of the coated panels for a period of 60 days.

TABLE 8 seawater immersion test results of the coated panels.

|  | Method | Ferrochrome slag #1 | Garnet | Coal Slag |
|---|---|---|---|---|
| Coating Material | | Phenolic epoxy coating | | |
| Dry film thickness (µm) | ISO 19840 | 333-354 | 337-372 | 328-371 |
|  |  | 343-357 | 340-364 | 318-363 |
|  |  | 345-373 | 323-354 | 331-356 |
| Blistering | ISO 4628-2 | 0 (S0) | 0 (S0) | 0 (S0) |
| Rusting | ISO 4628-3 | Ri 0 | Ri 0 | Ri 0 |
| Cracking | ISO 4628-4 | 0 (S0) | 0 (S0) | 0 (S0) |
| Flaking | ISO 4628-5 | 0 (S0) | 0 (S0) | 0 (S0) |
| Corrosion from a scratch | ISO 4628-8 | none | none | none |
| Delamination | ISO 4628-8 | none | none | none |
| Average Adhesion (MPa) | ISO 4624 | 15.0 | 16.3 | 13.8 |

No blistering, rusting, cracking, flaking, corrosion from a scratch, or delamination were observed on any of the panels. The thicknesses and average adhesion strengths of the coating films on the coated panels were similar for panels treated with different blasting abrasives.

Cyclic tests were conducted on the coated panels, each having a horizontal cut scratch with 2 mm width and 50 mm length, as described in ISO 12944-9 (formally ISO 20340). Each cycle of the cyclic test included 72 h of accelerated weathering test (QUV-A) under ultraviolet (UV) light, 72 h (hours) of salt spray test (SST), 24 h of exposure to low temperature (that is, −20° C.). The QUV-A tests were conducted under procedure disclosed in ISO 16474-3, including exposure to a fluorescent lamp emitting ultraviolet (UV) light and condensation to simulate the deterioration caused by sunlight and water (for example, rain and dew). A QUV-A cycle included 4 hours of UV light exposure at 60±3° C. using a UVA-340 lamp (irradiance set point: 0.83 W/m$^2$/nm (watts per meter squared per nanometer) and 4 hours of condensation at 50±3° C. The SST tests were conducted under procedure disclosed in ISO 9227, including exposure to constant spray of a 5% NaCl solution at 35° C. The exposure to low temperature tests were conducted by placing the coated panels in a freezer at a temperature of −20±2° C. After the tests, the coated panels were rinsed with deionized water. The coated panel were exposed to a total of 25 cycles (that is, 4200 hours).

TABLE 9 cyclic test results of the coated panels with epoxy coatings.

|  | Method | Ferrochrome slag #1 | Garnet | Coal Slag |
|---|---|---|---|---|
| Coating Material | | Epoxy coating | | |
| Dry film thickness (µm) | ISO 19840 | 317-346 | 334-375 | 307-375 |
|  |  | 315-341 | 315-358 | 331-365 |
|  |  | 306-339 | 290-344 | 314-348 |
| Blistering | ISO 4628-2 | 0 (S0) | 0 (S0) | 0 (S0) |
| Rusting | ISO 4628-3 | Ri 0 | Ri 0 | Ri 0 |
| Cracking | ISO 4628-4 | 0 (S0) | 0 (S0) | 0 (S0) |
| Flaking | ISO 4628-5 | 0 (S0) | 0 (S0) | 0 (S0) |
| Corrosion from a scratch | ISO 4628-8 | Grade 2 | Grade 2 | Grade 2 |
| Average Adhesion (MPa) | ISO 4624 | 11.8 | 11.6 | 11.9 |

TABLE 10 cyclic test results of the coated panels with phenolic epoxy coatings.

|  | Method | Ferrochrome slag #1 | Garnet | Coal Slag |
|---|---|---|---|---|
| Coating Material | | Phenolic epoxy coating | | |
| Dry film thickness (µm) | ISO 19840 | 350-374 | 348-364 | 312-336 |
|  |  | 330-343 | 328-372 | 340-374 |
|  |  | 328-340 | 343-384 | 360-402 |
| Blistering | ISO 4628-2 | 0 (S0) | 0 (S0) | 0 (S0) |
| Rusting | ISO 4628-3 | Ri 0 | Ri 0 | Ri 0 |
| Cracking | ISO 4628-4 | 0 (S0) | 0 (S0) | 0 (S0) |
| Flaking | ISO 4628-5 | 0 (S0) | 0 (S0) | 0 (S0) |
| Corrosion from a scratch | ISO 4628-8 | Grade 1 | Grade 1 | Grade 1 |
| Average Adhesion (MPa) | ISO 4624 | 15.0 | 13.0 | 12.5 |

No blistering, rusting, cracking, or flaking were observed on any of the panels. No corrosion creep observed on any of the panels of epoxy coating system, black stains observed in the tested area which is not rust. No corrosion creep was observed on any of the panels coated with phenolic epoxy coating system. The average adhesion test results of epoxy coating systems with all three different blasting abrasives were similar. However, phenolic epoxy coating systems showed that the coated panel treated with ferrochrome slag #1 had greater adhesion comparing to garnet and coal slag.

Unless defined otherwise, all technical and scientific terms used have the same meaning as commonly understood by one of ordinary skill in the art to which these systems, apparatuses, methods, processes, and compositions belong.

As used here and in the appended claims, the words "comprise," "has," and "include" and all grammatical variations thereof are each intended to have an open, non-limiting meaning that does not exclude additional elements or steps.

"Optionally" or "optional" mean that the subsequently described event or circumstances may or may not occur. The description includes instances where the event or circumstance occurs and instances where it does not occur.

When the words "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range. For the particle size distributions disclosed, it is to be understood that due to limitations in screening processes used to determine the particle size that there may be a variance.

Throughout this application, where patents or publications are referenced ("references"), the disclosures of these references in their entireties are intended to be incorporated by reference into this application in order to more fully describe the state of the art to which the invention pertains, except when these references contradict the statements made within this application.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of" The words "comprise," "has," and "include" and all grammatical variations thereof are each intended to have an open, non-limiting meaning that does not exclude additional elements or steps.

What is claimed:

1. A blasting abrasive, comprising:
a ferrochrome slag having a composition of $SiO_2$ in a range of from about 30 to 40 wt % (weight percent); $Al_2O_3$ in a range of from about 25 to 35 wt %; $Fe_2O_3$, $Cr_2O_3$, or a combination thereof in a range of from about 10-20 wt %; MgO in a range of from about 15 to 25 wt %, by weight of the ferrochrome slag,
wherein the ferrochrome slag has a particle size in a range of from about 100 to 850 μm (micrometers), and
wherein the ferrochrome slag has a particle size distribution in a range of from about 25 to 30% of particles sized in a range of from 600 to 850 μm, in a range of from about 10 to 20% of particles sized in a range of from 500 to 600 μm, in a range of from about 10 to 20% of particles sized in a range of from 425 to 500 μm, in a range of from about 15 to 25% of particles sized in a range of from 250 to 425 μm, in a range of from about 5 to 10% of particles sized in a range of from 212 to 250 μm, in a range of from about 10 to 15% of particles sized in a range of from 150 to 212 μm, in a range of from about 0.1 to 5% of particles sized in a range of from 106 to 150 μm, based on number of particles.

2. The blasting abrasive of claim 1, wherein the composition of the ferrochrome slag further comprises CaO in a range of greater than 0 to about 5 wt %, by weight of the ferrochrome slag.

3. A blasting abrasive, comprising:
a ferrochrome slag having a composition of $SiO_2$ in a range of from about 30 to 40 wt % (weight percent): $Al_2O_3$ in a range of from about 25 to 35 wt %; of $Fe_2O_3$, $Cr_2O_3$, or a combination thereof in a range of from about 10-20 wt %; MgO in a range of from about 15 to 25 wt %, by weight of the ferrochrome slag,
wherein the ferrochrome slag has a particle size in a range of from about 100 to 850 μm (micrometers),
wherein the ferrochrome slag has a particle size distribution in a range of from about 20 to 30% of particles sized in a range of from 600 to 850 μm, in a range of from about 20 to 30% at 500 to 600 μm, in a range of from about 10 to 20% of particles sized in a range of from 425 to 500 μm, in a range of from about 15 to 20% of particles sized in a range of from 250 to 425 μm, in a range of from about 8 to 13% of particles sized in a range of from 212 to 250 μm, and in a range of from about 2 to 10% of particles sized in a range of from 150 to 212 μm, based on number of particles.

4. The blasting abrasive of claim 1, wherein the ferrochrome slag is a recycled material.

5. A method of surface preparation, comprising:
introducing a blasting abrasive suspension onto a surface such that a contaminant is removed from the surface, and a treated surface forms,
wherein the blasting abrasive suspension comprises a ferrochrome slag suspended in a carrier gas,
wherein the ferrochrome slag has a composition of $SiO_2$ in a range of from about 30 to 40 wt % (weight percent); $Al_2O_3$ in a range of from about 25 to 35 wt %; of $Fe_2O_3$, $Cr_2O_3$, or a combination thereof in a range of from about 10-20 wt %; MgO in a range of from about 15 to 25 wt %, by weight of the ferrochrome slag has a particle size in a range of from about 100 to 850 μm (micrometers), and
wherein the ferrochrome slag has a particle size distribution in a range of from about 25 to 30% of particles sized in a range of from 600 to 850 μm, in a range of from about 10 to 20% of particles sized in a range of from 500 to 600 μm, in a range of from about 10 to 20% of particles sized in a range of from 425 to 500 μm, in a range of from about 15 to 25% of particles sized in a range of from 250 to 425 μm, in a range of from about 5 to 10% of particles sized in a range of from 212 to 250 μm, in a range of from about 10 to 15% of particles sized in a range of from 150 to 212 μm, in a range of from about 0.1 to 5% of particles sized in a range of from 106 to 150 μm, based on number of particles.

6. A method of surface preparation, comprising:
introducing a blasting abrasive suspension onto a surface such that a contaminant is removed from the surface, and a treated surface forms,
wherein the blasting abrasive suspension comprises a ferrochrome slag suspended in a carrier gas, wherein the ferrochrome slag has a composition of $SiO_2$ in a range of from about 30 to 40 wt % (weight percent): $Al_2O_3$ in a range of from about 25 to 35 wt %; of $Fe_2O_3$, $Cr_2O_3$, or a combination thereof in a range of from about 10-20 wt %; MgO in a range of from about 15 to 25 wt %, by weight of the ferrochrome slag has a particle size in a range of from about 100 to 850 μm (micrometers), wherein the ferrochrome slag has a particle size distribution in a range of from about 20 to 30% of particles sized in a range of from 600 to 850 μm, in a range of from about 20 to 30% at 500 to 600 μm, in a range of from about 10 to 20% of particles sized in a range of from 425 to 500 μm, in a range of from about 15 to 20% of particles sized in a range of from 250 to 425 μm, in a range of from about 8 to 13% of particles sized in a range of from 212 to 250 μm, and in a range of from about 2 to 10% of particles sized in a range of from 150 to 212 μm, based on number of particles.

7. The method of claim 5, wherein the carrier gas of the blasting abrasive suspension is air.

8. The method of claim 5, wherein the carrier gas is pressurized to a pressure in a range of from 90 to 100 psi (pounds per square inch) before introduction to the surface.

9. The method of claim 5, wherein the surface is comprised of a material selected from a group consisting of carbon steel, galvanized steel, stainless steel, aluminum, and alloys.

10. The method of claim 5, wherein the treated surface has a surface profile in a range of from about 50 to 100 μm based upon ISO 8503-5.

11. The method of claim 5, wherein the treated surface has a surface cleanliness in a range of from about 2.5 to 3 Sa based upon ISO 8501-1.

\* \* \* \* \*